US009896269B2

(12) United States Patent
Williams et al.

(10) Patent No.: US 9,896,269 B2
(45) Date of Patent: Feb. 20, 2018

(54) METHOD OF FORMING A SUBTERRANEAN GAS STORAGE VESSEL

(71) Applicant: Halliburton Energy Services, Inc., Houston, TX (US)

(72) Inventors: Brett Wade Williams, Tuttle, OK (US); Paul Joseph Jones, Houston, TX (US); Marcus Allen Duffy, El Reno, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 303 days.

(21) Appl. No.: 14/702,518

(22) Filed: May 1, 2015

(65) Prior Publication Data

US 2016/0318710 A1      Nov. 3, 2016

(51) Int. Cl.
*B65G 5/00*        (2006.01)
*E21B 41/00*       (2006.01)

(52) U.S. Cl.
CPC ............ *B65G 5/00* (2013.01); *E21B 41/0057* (2013.01)

(58) Field of Classification Search
CPC ............ B65G 5/00; E21B 33/14; E21B 33/16
USPC ........................................ 405/53, 55, 57, 52
See application file for complete search history.

(56) References Cited

U.S. PATENT DOCUMENTS

| 3,064,734 | A | * | 11/1962 | Toelke | E21B 33/134 |
| | | | | | 166/117 |
| 3,070,163 | A | * | 12/1962 | Colby | C09K 8/5086 |
| | | | | | 166/135 |
| 3,170,516 | A | * | 2/1965 | Corley, Jr. | C09K 8/516 |
| | | | | | 166/192 |
| 3,208,525 | A | * | 9/1965 | Caldwell | C09K 8/5086 |
| | | | | | 166/286 |
| 4,917,188 | A | | 4/1990 | Fitzpatrick, Jr. | |
| 5,207,530 | A | | 5/1993 | Brooks et al. | |
| 6,244,344 | B1 | | 6/2001 | Chatterji et al. | |
| 6,350,309 | B2 | | 2/2002 | Chatterji et al. | |
| 6,555,507 | B2 | | 4/2003 | Chatterji et al. | |
| 6,840,709 | B2 | * | 1/2005 | Dahlem | E21F 17/16 |
| | | | | | 405/53 |
| 7,762,329 | B1 | | 7/2010 | Morgan et al. | |
| 2012/0328377 | A1 | | 12/2012 | Brennels et al. | |
| 2013/0220612 | A1 | | 8/2013 | Karcher et al. | |

OTHER PUBLICATIONS

International Search Report and Written Opinion dated May 12, 2016 in corresponding international application No. PCT/US16/018951, Halliburton Energy Services, Inc.

* cited by examiner

*Primary Examiner* — Sunil Singh
(74) *Attorney, Agent, or Firm* — McAfee & Taft

(57) ABSTRACT

A method of forming a subterranean gas storage vessel is provided. A wellbore is drilled through the surface of the ground into the ground, and a casing is inserted into the wellbore, the casing having a size such that a wellbore annulus is formed between the outside surface of the casing and the wall of the wellbore. A cement sheath is then formed in the wellbore annulus, and the interior of the casing is sealed to help prevent gas from inadvertently escaping therefrom. The cemented and sealed casing can then be used as a storage vessel to store and dispense gas such as compressed natural gas (CNG).

19 Claims, 6 Drawing Sheets

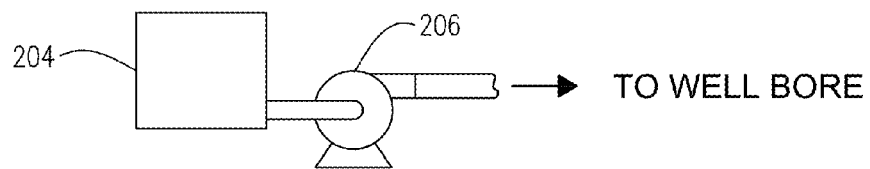
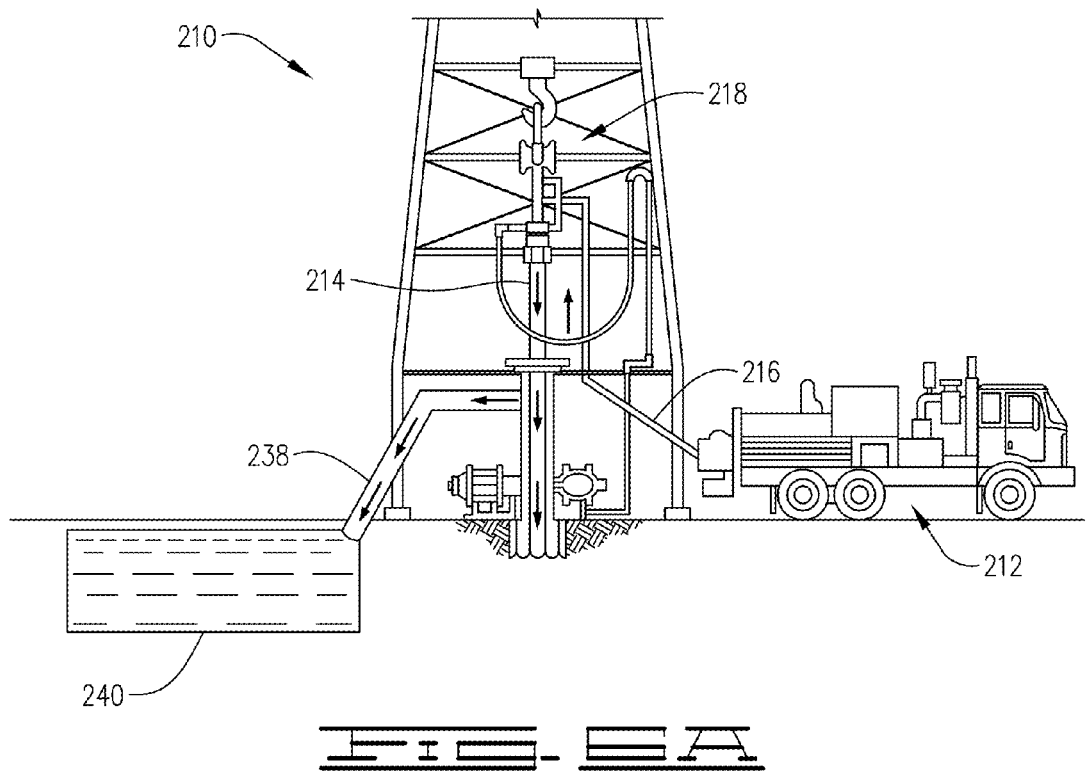
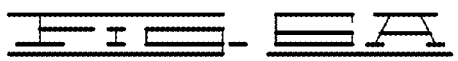

METHOD OF FORMING A SUBTERRANEAN GAS STORAGE VESSEL

BACKGROUND

Compressed natural gas ("CNG") is natural gas (composed primarily of methane) that is stored at high pressure. CNG can be used in place of gasoline and diesel fuel in internal combustion engines and is becoming more popular as a source of fuel for automobiles and other vehicles. There are many advantages to CNG. For example, CNG generally emits fewer pollutants and costs less than gasoline and diesel fuel.

The cost of and space required for CNG storage tanks have been obstacles to creating more CNG facilities for automotive and other vehicle uses, particularly in urban environments. CNG is generally compressed to less than one percent of the volume it occupies at standard atmospheric pressure. It is typically stored under high pressure in containers which undergo repeated pressure and temperature cycling. Thus, it is important for CNG storage vessels to be strong, leak proof and able to reliably contain a high volume of natural gas that can be compressed at high pressures.

BRIEF DESCRIPTION OF THE DRAWINGS

FIG. 5 illustrates a system for preparation and delivery of a settable cement composition and/or a settable resin composition to a casing and/or wellbore in accordance with aspects of the present disclosure.

FIG. 6A illustrates surface equipment that may be used in placement of a settable cement composition and/or a settable resin composition in a casing and/or wellbore in accordance with aspects of the present disclosure.

DETAILED DESCRIPTION

Figure 1:
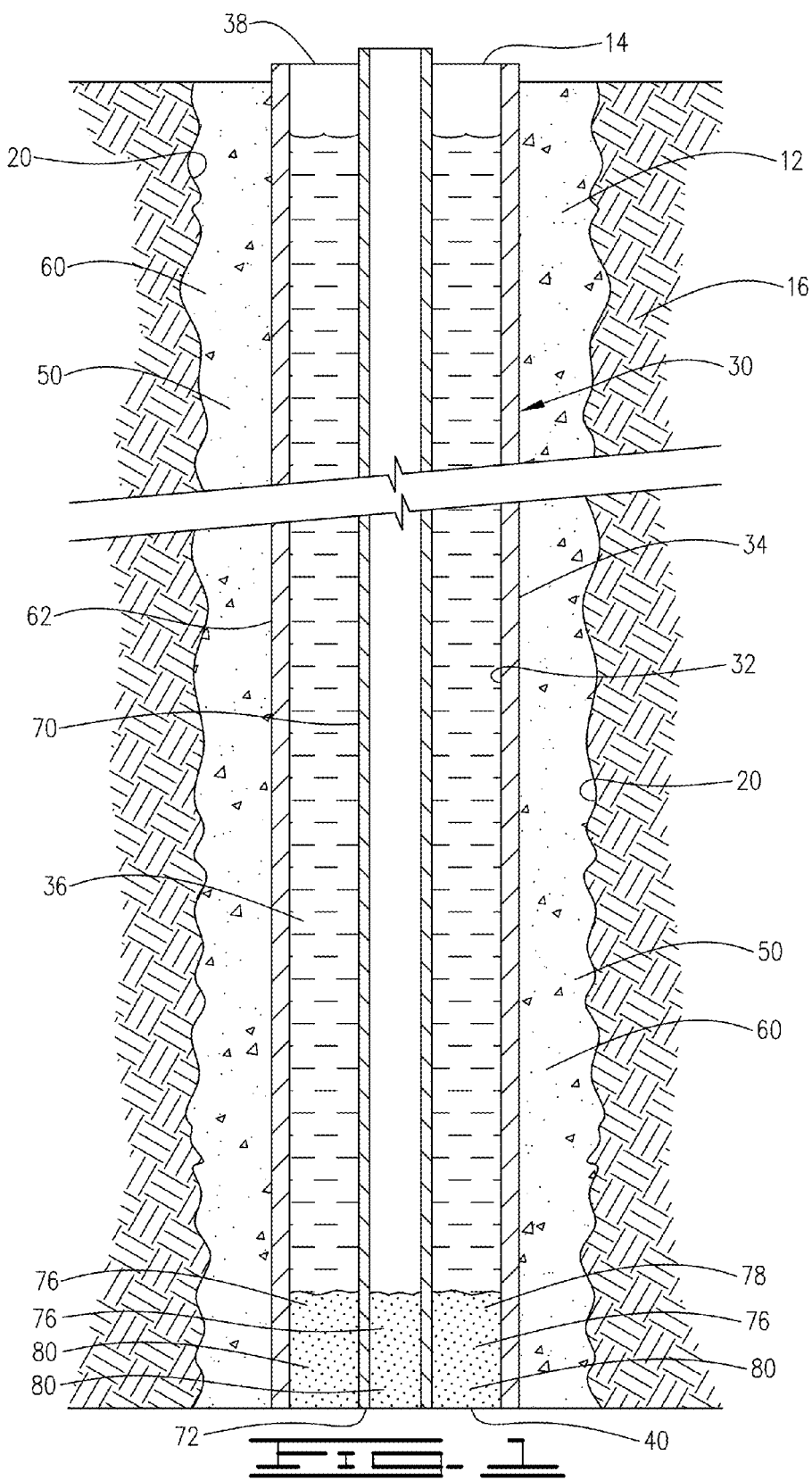
FIGS. 1-4 are sectional views illustrating various techniques by which a cement sheath can be formed in the wellbore annulus and the interior of the casing can be sealed in accordance with aspects of the present disclosure.

A method of forming a subterranean gas storage vessel is provided. For example, the subterranean gas storage vessel can be used to store CNG. The CNG can be withdrawn from and dispensed from the subterranean gas storage vessel as needed. Thus, a method of forming a subterranean gas storage vessel and using the subterranean gas storage vessel to store CNG, and a method of forming a subterranean gas storage vessel and using the subterranean gas storage vessel to store CNG and dispense natural gas, are also provided. The subterranean gas storage vessel can be used to store and dispense other types of gases, including other types of gases that are pressurized in the storage vessel, as well.

The present methods comprise the following steps:

(a) drilling a wellbore through the surface of the ground into the ground, the wellbore having a wellbore wall;

(b) inserting a casing into the wellbore, the casing having an interior, an outside surface, a top and a bottom end, the casing further having a size such that a wellbore annulus is formed between the outside surface of the casing and the wellbore wall when the casing is inserted into the wellbore;

(c) forming a cement sheath in the wellbore annulus; and (d) sealing at least a portion of the interior of the casing to help prevent gas that is stored in the casing from inadvertently escaping from the casing.

The cemented and sealed casing can then be used as a storage vessel to store and dispense gas such as CNG. The order in which steps (c) and (d) of the present method are carried out can vary. As used herein and in the appended claim, a "wellbore annulus" means an annular space between the outside surface of the casing and the wellbore wall.

The wellbore can be drilled through the surface of the ground into the ground using any suitable technique. For example, the rotary drilling method typically used to drill oil and gas wells that penetrate subterranean formations can be used. The wellbore can be drilled to any desired depth. For example, the wellbore can be in the range of from about 25 feet to about 5000 feet deep. By way of further example, the wellbore can be in the range of from about 300 feet to about 2500 feet deep. By way of further example, the wellbore can be in the range of from about 500 to about 1500 feet deep. For example, the wellbore can be substantially vertical, substantially horizontal, or deviated.

The casing can also be inserted into the drilled wellbore using any suitable technique, including those techniques known in the oil and gas industry for inserting casings into wellbores that penetrate subterranean formations. For example, the casing can be floated into the wellbore.

For example, the casing can be a tubular casing of the type used in connection with oil and gas wells that penetrate subterranean formations. For example, the casing can be a large diameter casing having a thick wall. For example, the outside diameter of the casing can be in the range of from about 4.5 inches to about 24.5 inches. By way of further example, the outside diameter of the casing can be in the range of from about 4.5 inches to about 20 inches. The thickness of the wall of the casing can have a wide range depending, for example, on the outside diameter of the casing. For example, the wall of the casing can have a thickness in the range of from about 0.1 inches to about 2 inches. For example, the wall of the casing can have a thickness in the range of from about 0.25 inches to about 1 inch. By way of further example, the wall of the casing can have a thickness in the range of from about 0.25 inches to about 1 inch. For example, the casing can be formed of steel. Metals and other metal alloys can be used as well. For example, the casing can have a length such that it extends from the surface to near the bottom end of the wellbore.

The casing can include a shoe track or float joint, that is a full size length of casing placed at the bottom of the casing string that typically includes a float collar at its top end and a float shoe at its bottom end to prevent reverse flow of the cement composition and/or other fluids back into the casing after placement of the cement composition into the wellbore annulus. Typically, some of the cement composition is left in the shoe track in the interior of the casing to ensure that good cement remains on the outside of the bottom of the casing and mitigate the risk of over-displacing the cement.

The cement sheath can be formed in accordance with the present methods by placing a settable cement composition into the wellbore annulus and allowing the settable cement composition to set. The settable cement composition includes a cement formulation and enough water to form a pumpable slurry. For example, the cement formulation can be selected from the group consisting of a conventional cement composition, a resin composition and a comingled cement-resin composition. For example, the cement formulation can be a conventional cement composition. By way of further example, the cement formulation can be a resin composition. By way of further example, the cement formulation can be a comingled cement-resin composition. The particular type of cement formulation utilized will depend on a number of factors. For example, a resin composition or comingled cement-resin composition might be utilized as the cement formulation in applications when increased flexibility and strength are desired. Such applications may include applications in which repeated hydraulic stress and thermal cycles are encountered.

The procedure used to form the cement sheath in accordance with the present method is a primary cementing operation. The function of a cement sheath may include providing physical support and positioning of the casing in the wellbore, bonding of the casing to the walls of the wellbore, preventing the movement of fluid (liquid or gas) between formations penetrated by the wellbore, and preventing fluid from escaping the well at the surface of the formation. The set cement sheath should be able to endure a number of stresses after the primary cementing operation.

As the settable cement composition sets in the wellbore annulus, it turns into a cement sheath that is a hardened, impermeable cement mass. It is helpful if the settable cement composition develops high bond strength after setting and also has sufficient resiliency, that is, elasticity and ductility, to resist loss of casing or wellbore wall bond, cracking and/or shear deterioration or failure as a result of casing movements, impacts and/or shocks.

The step of sealing at least a portion of the interior of the casing in accordance with the present methods can include, for example, sealing the interior of the casing adjacent to the bottom end of the casing. The bottom end of the casing itself, both inside and/or outside the casing, can also be sealed. For example, the shoe track of the casing or a portion thereof can be sealed. If desired, a portion of the wellbore annulus can also be sealed.

At least a portion of the interior of the casing can be sealed in accordance with the present methods by placing a settable resin composition in the interior of the casing and allowing the settable resin composition to set. The settable resin composition includes a resin formulation and enough water to form a pumpable slurry. For example, the resin formulation can be selected from the group consisting of a resin composition and a comingled cement-resin composition. By way of further example, the resin formulation can be a resin composition. By way of further example, the resin formulation can be a comingled cement-resin composition.

The step of sealing at least a portion of the interior of the casing in accordance with the inventive methods helps assure that stored and compressed gas will not inadvertently escape from the casing. The cement sheath around the outside and bottom of the casing may be compromised due to shear and compression stresses exerted on the set cement. Such stress conditions may be caused by high pressures and/or temperatures inside the casing during storage of CNG, for example. The high internal casing pressure and/or temperature and the cycling thereof can result in expansion of the casing, both radially and longitudinally, which places stresses on the cement sheath potentially causing it to crack or the bonds between the exterior surfaces of the casing and/or the wellbore wall and the cement sheath to fail resulting in a loss of hydraulic seal.

The particular cement formulation used to form the settable cement composition and the particular resin formulation used to form the settable resin composition can vary. For example, in one embodiment, the cement formulation is a conventional cement composition, and the resin formulation is a resin composition. In another embodiment, the cement formulation is a conventional cement composition, and the resin formulation is a comingled cement-resin composition. In yet another embodiment, both the cement formulation and the resin formulation are a resin composition. In yet another embodiment, both the cement formulation and the resin formulation are a comingled cement-resin composition.

The Conventional Cement Composition

The conventional cement composition that can be used as the cement formulation of the settable cement composition used in accordance with the present methods can be, for example, any hydraulic or non-hydraulic cement that is suitable for the construction of a cement sheath in primary cementing operations. For example, the conventional cement composition can be a hydraulic cement. By way of further example, the conventional cement composition can be a non-hydraulic cement.

Examples of suitable hydraulic cements include hydraulic cements that comprise calcium, aluminum, silicon, oxygen and/or sulfur, and which set and harden by reaction with water. Such hydraulic cements include, but are not limited to, Portland cements, pozzolana cements, gypsum cements, high-alumina-content cements, slag cements, silica cements and combinations thereof. For example, the hydraulic cement may comprise a Portland cement. Suitable Portland cements include Portland cements classified as Class A, B, C, D, E, F, G and H cements according to American Petroleum Institute, Recommended Practice for Testing Well Cements, API Specification 10B-2 (ISO 10426-2), First Edition, July 2005. In addition, cements suitable for use in accordance with the present methods may include cements classified as ASTM Type I, II, III, IV, or V. For example, the hydraulic cement can be an API Portland cement including Classes A, B, C, G and H. By way of further example, the hydraulic cement can be an API Class G or H Portland cement. By way of further example, the hydraulic cement can be an API Class G Portland cement.

Examples of suitable non-hydraulic cements include gypsum plaster, lime, blast furnace slag and mixtures thereof. Non-hydraulic cements may be created, for example, using materials such as non-hydraulic lime and gypsum plasters, and oxychloride, which has liquid properties.

An example of a cement that serve as a suitable hydraulic cement or non-hydraulic cement is an acid-base cement. The acid-base cement may be any acid-base cement known in the art, including acid-base cements used in other industries, such as acid-base cements employed in dental applications such as calcium phosphate acid-base cements. As used herein, "acid-base cement" refers to any cement that comprises an acid source and a base source capable of reacting to form a set cement. For example, the acid-base cement can comprise any combination of a Lewis acid (electron pair acceptor) with a Lewis base (electron pair donor).

A broad variety of acid sources and base sources may be suitable for use in forming acid-base cements. Examples of suitable acid sources include magnesium chloride ($MgCl_2$), potassium phosphate monobasic ($KH_2PO_4$), phosphoric acid ($H_3PO_4$), magnesium sulfate ($MgSO_4$) and ammonium phosphate monobasic ($NH_2PO_4$). Examples of suitable base sources include magnesium oxide (MgO), and ammonia ($NH_3$). An example of a suitable source of magnesium oxide is commercially available from Martin Marietta under the trade name "MAGCHEM® 10." An example of a suitable source of potassium phosphate monobasic is commercially available from Fisher Scientific.

Generally, the acid source and base source react in the presence of water to form an acid-base cement. For example, magnesium oxide may be chosen as a base source, and potassium phosphate monobasic may be chosen as an acid source, so that in the presence of water they may react to produce an acid-base cement having the chemical formula $MgKPO_4$—$OH_2O$. As another example, magnesium oxide may be chosen as a base source, and magnesium chloride may be chosen as an acid source, so that in the presence of water they may react to produce an acid-base cement having three oxychloride phases with one oxychloride phase having the chemical formula $5\ Mg(OH_2)MgCl_2\text{-}8H_2O$ (which may be referred to as "5-form"). As another example, magnesium oxide may be chosen as a base source, and phosphoric acid may be chosen as an acid source, so that in the presence of water they may react to produce an acid-base cement having the chemical formula $MgHPO_4$—$5H_2O$. As still another example, magnesium oxide may be chosen as a base source, and magnesium sulfate may be chosen as an acid source, so that in the presence of water they may react to produce an acid-base cement having four possible oxysulfate phases with one oxysulfate phase having the chemical formula $3\ Mg(OH)2MgSO_4\text{-}8H_2O$ (which may be referred to as "3-form"). As still another example, magnesium oxide may be chosen as a base source, and ammonium phosphate monobasic may be chosen as an acid source, so that in the presence of water they may react to produce an acid-base cement having the chemical formula $Mg(NH)4PO_4$—$OH_2O$. A broad variety of acid sources and base sources may be used, and a broad variety of acid-base cements may be produced, in accordance with the present methods, including, but not limited to, those acid sources, base sources, and acid-base cements that are disclosed in "Acid-Base Cements: Their Biomedical and Industrial Applications," by Alan D. Wilson and John W. Nicholson (Cambridge Univ. Press, 1993).

Generally, the acid source and base source may be present in a stoichiometric amount. For example, when magnesium oxide is used as a base source and potassium phosphate monobasic is used as an acid source, their relative concentrations may be illustrated by EQUATION 1 below.

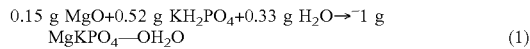

$$0.15\ g\ MgO + 0.52\ g\ KH_2PO_4 + 0.33\ g\ H_2O \rightarrow 1\ g\ MgKPO_4\text{---}OH_2O \quad (1)$$

EQUATION (1) above is merely exemplary, and may be modified as one of ordinary skill in the art will recognize, with the benefit of this disclosure. For example, additional quantities of magnesium oxide may be included, in amounts in the range of from about 1% excess by weight to about 25% excess by weight, including any value in between or fractions thereof.

For example, a suitable acid-base cement for use as the conventional cement composition in accordance with the present methods is an acid-base cement that includes at least one acid source selected from the group consisting of magnesium chloride ($MgCl_2$), zinc chloride ($ZnCl_2$), potassium phosphate monobasic ($KH_2PO_4$), phosphoric acid ($H_3PO_4$), magnesium sulfate ($MgSO_4$), ammonium phosphate monobasic ($NH_4H_2PO_4$), and any combination thereof. In some embodiments, an acid-base cement that includes at least one base source selected from the group consisting of magnesium oxide (MgO), zinc oxide (ZnO), ammonia ($NH_3$), and any combination thereof may be used. For example, in some embodiments, the acid-base cement comprises a Sorel cement comprising magnesium, zinc, or mixtures thereof. In some embodiments, the Sorel cement is based on magnesium. In some embodiments, the Sorel cement has a formula $Mg_4Cl_2(OH)_6(H_2O)_8$. In some embodiments, the Sorel cement is a zinc variant employing zinc chloride and zinc oxide.

The conventional cement compositions used in accordance with the present methods may be foamed or non-foamed. The conventional cement compositions may comprise a conventional lost circulation material. The conventional lost circulation material may be any material that may minimize the loss of fluid circulation into the fractures and/or permeable zones of a formation into which the wellbore is drilled. Examples of suitable conventional lost circulation materials include, but are not limited to, asphaltenes, ground coal, cellulosic materials, plastic materials, and the like. In certain exemplary embodiments, the conventional lost circulation materials may be provided in particulate form. One of ordinary skill in the art with the benefit of this disclosure will recognize the appropriate amount of the conventional lost circulation material for a chosen application.

Optionally, additional additives may be added to the conventional cement compositions used in accordance with the present methods as deemed appropriate by one skilled in the art, with the benefit of this disclosure. Examples of such additives include fly ash, silica, fluid loss control additives, surfactants, dispersants, accelerators, retarders, salts, mica, fibers, formation-conditioning agents, bentonite, cement kiln dust (CKD), expanding additives, microspheres, weighting materials, defoamers, and the like. For example, the conventional cement compositions used in accordance with the present methods may be foamed cement compositions comprising one or more foaming surfactants that may generate foam when contacted with a gas, e.g., nitrogen. An example of a suitable fly ash is an ASTM Class F fly ash that is commercially available from Halliburton Energy Services of Dallas, Tex. under the trade designation "POZMIX® A." An example of a suitable expanding additive comprises deadburned magnesium oxide. Examples of commercially available additives that can be used to modify the mechanical properties of the conventional cement composition and help the composition withstand stresses due to temperature and pressure fluctuations are sold by Halliburton Energy Services at various locations under the trademarks "WELL-LIFE® 665," "WELLLIFE® 809," and "LIFECEM™ 100."

An example of a suitable conventional cement composition that can be used as the cement formulation of the settable cement composition in accordance with the present methods consists of Portland cement.

The Resin Composition

The resin composition that can be used as the cement formulation of the settable cement composition and/or the resin formulation of the settable resin composition in accordance with the present methods can comprise a hardenable resin. The resin composition may also include a hardening agent, a solvent, and an aqueous diluent or carrier fluid. The resin composition can include other components as well. For example, the resin composition can include cement kiln dust ("CKD") and other materials including heavyweight and lightweight materials to either increase or decrease the density, as needed.

As used herein and in the appended claims, the term "hardenable resin" refers to any of a number of physically polymerizable synthetics or chemically modified natural resins including thermoplastic materials and thermosetting materials. Examples of hardenable resins that can be used include, but are not limited to, epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, bisphenol A diglycidyl ether resins, butoxymethyl butyl glycidyl ether resins, bisphenol A-epichlorohydrin resins, bisphenol F resins, glycidyl ether resins, polyester resins and hybrids and copolymers thereof, polyurethane resins and hybrids and copolymers thereof, acrylate resins, and mixtures thereof. Some suitable hardenable resins, such as epoxy resins, may be cured with an internal catalyst or activator so that when pumped down hole, they may be cured using only time and temperature. Other suitable hardenable resins, such as furan resins generally require a time-delayed catalyst or an external catalyst to help activate the polymerization of the resins if the cure temperature is low (i.e., less than about 250° F.), but will cure under the effect of time and temperature if the formation temperature is above about 250° F., preferably above about 300° F. It is within the ability of one skilled in the art, with the benefit of this disclosure, to select a suitable hardenable resin for use in connection with the resin composition used in accordance with the present methods and to determine whether a catalyst and/or and any other components are required to be included in the resin composition to trigger curing of the hardenable resin. One hardenable resin that may be used is the consolidation agent commercially available from Halliburton Energy Services, Inc., of Duncan, Okla., under the trade name EXPEDITE®.

Selection of a suitable hardenable resin may be affected by the temperature associated with the wellbore and the interior of the casing. By way of example, for wellbores having a bottom hole static temperature ("BHST") ranging from about 60° F. to about 250° F., two-component epoxy-based resins comprising a hardenable resin component and a hardening agent component containing specific hardening agents may be used. For example, for subterranean formations having a BHST ranging from about 300° F. to about 600° F., a furan-based resin may be used. For example, for subterranean formations having a BHST ranging from about 200° F. to about 400° F. either a phenolic-based resin or a one-component HT epoxy-based resin may be suitable. For example, for subterranean formations having a BHST of at least about 175° F., a phenol/phenol formaldehyde/furfuryl alcohol resin may also be suitable.

For example, in forming the resin composition used in accordance with the present methods, the hardenable resin of the resin composition may be minimally diluted to provide a target viscosity. For example, hardenable resins having target viscosities in the range from about 1 cps to about 50,000 cps, including about 1 cps, about 100 cps, about 1,000 cps, about 10,000 cps and about 50,000 cps, including any value in between and fractions thereof may be used.

For example, the hardenable resin may be diluted in an amount in the range of about 5% to about 100% by volume (that is neat undiluted resin). For example, the hardenable resin may be present in the resin composition in an amount in the range of from about 75% to about 100% by volume based on the total volume of the resin composition. For example, the hardenable resin may be present in the resin composition in an amount in the range of from about 95% to about 100% by volume based on the total volume of the resin composition. It is within the ability of one skilled in the art with the benefit of this disclosure to determine how much of the dilution the resin may need to achieve the desired results. Factors that may affect this decision include the type of hardenable resin and liquid hardening agent used in a particular application.

In some embodiments, a solvent may be added to the resin composition to reduce the viscosity of the composition for ease of handling, mixing and transferring. However, in particular embodiments, it may be desirable not to use such a solvent. It is within the ability of one skilled in the art with the benefit of this disclosure to determine if and how much solvent may be needed to achieve a viscosity suitable to the subterranean conditions of a particular application. Factors that may affect this decision include geographic location of the well, the surrounding weather conditions, and the desired long-term stability of the wellbore servicing fluid. Moreover, the dilution of the hardenable resin may be a function of the ability to provide a proper seal in accordance with the present methods. An exemplary condition that may affect the ability to provide a proper seal may be the direction of the portion wellbore hole being cemented, such as a vertical section, horizontal section, or deviated section.

Generally, any solvent that is compatible with the hardenable resin and that achieves the desired viscosity effect may be suitable. Suitable solvents may include, but are not limited to, polyethylene glycol, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters, and combinations thereof. Selection of an appropriate solvent may be dependent on the hardenable resin chosen. With the benefit of this disclosure, the selection of an appropriate solvent should be within the ability of one skilled in the art. For example, the amount of the solvent used in the resin composition may be in the range of about 0.1% to about 30% by weight of the hardenable resin. Optionally, the resin composition may be heated to reduce its viscosity, in place of, or in addition to using a solvent.

The resin composition may also comprise an aqueous diluent, non-aqueous diluent, reactive diluent or carrier fluid to reduce the viscosity of the composition. The aqueous fluids used may comprise fresh water, saltwater (e.g., water containing one or more salts dissolved therein), brine (e.g., saturated saltwater), seawater, or combinations thereof, and may be from any source, provided that they do not contain components that might adversely affect the stability and/or performance of the cemented wellbore. The resin composition may also comprise dispersants and/or defoamers to further modulate the viscosity.

For example, in some applications, a liquid hardening agent component is included in the resin composition for facilitating the set of the hardenable resin. For example, the liquid hardening agent component may comprise a hardening agent and an optional silane coupling agent. As used herein, "hardening agent" refers to any substance capable of transforming the hardenable resin into a hardened, consolidated mass. Examples of suitable hardening agents include, but are not limited to, aliphatic amines, aliphatic tertiary amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, N-aminophenyl piperazine, imidazoline, 1,2-diaminocyclohexane, polyetheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof.

Specific examples of suitable hardening agents may include, but are not limited to ETHACURE® 100, available from Albemarle Corp. of Raton Rouge, La., and JEFFAMINE® D-230, available from Huntsman Corp. of The Woodlands, Tex. The hardening agent may be included in the liquid hardening agent component in an amount sufficient to at least partially harden the hardenable resin of the resin composition. In some embodiments, the hardening agent used may be included in the liquid hardening agent component in an amount in the range of from about 5% to about 100% by volume of the liquid hardening agent component. In other embodiments, the hardening agent used may be included in the liquid hardening agent component in an amount in the range of from about 50% to about 75% by volume of the liquid hardening agent component.

In some embodiments the hardening agent may comprise a mixture of hardening agents selected to impart particular qualities to the resin composition. For example, in particular embodiments, the hardening agent may comprise a fast-setting hardening agent and a slow-setting hardening agent. As used herein, "fast-setting hardening agent" and "slow-setting hardening agent" do not imply any specific rate at which the agents set a hardenable resin; instead, the terms merely indicate the relative rates at which the hardening agents initiate hardening of the resin. Whether a particular hardening agent is considered fast-setting or slow-setting may depend on the other hardening agent(s) with which it is used. In a particular embodiment, ETHACURE® 100 may be used as a slow-setting hardening agent and JEFFAMINE® D-230, may be used as a fast-setting hardening agent. In some embodiments, the ratio of fast-setting hardening agent to slow-setting hardening agent may be selected to achieve a desired behavior of liquid hardening agent component. For example, in some embodiments, the fast-setting hardening agent may be included in the liquid hardening agent component in a ratio of approximately 1:5, by volume, with the slow-setting hardening agent. With the benefit of this disclosure, one of ordinary skill in the art should be able to select the appropriate ratio of hardening agents for use in a particular application.

The liquid hardening agent component of the resin composition may also include an optional silane coupling agent. The silane coupling agent may be used, among other things, to help bond the resin to CKD the surface of the wellbore wall. Examples of suitable silane coupling agents include, but are not limited to, N-2-(aminoethyl)-3-aminopropyltrimethoxysilane; 3-glycidoxypropyltrimethoxysilane; gamma-aminopropyl-triethoxysilane; N-beta-aminoethyl)-gamma-aminopropyltrimethoxysilanes; aminoethyl-N-beta-(aminoethyl)-gamma-aminopropyltrimethoxysilanes; gamma-ureidopropyl-triethoxysilanes; beta-(3-4 epoxy-cyclohexyl)-ethyl-trimethoxysilane; gamma-glycidoxypropyl-trimethoxysilanes; vinyltrichlorosilane; vinyltris (beta-methoxyethoxy) silane; vinyl triethoxysilane; vinyltrimethoxysilane; 3-metacryloxypropyltrimethoxysilane; beta-(3,4 epoxycyclohexyl)-ethyltrimethoxysilane; r-glycidoxypropyltrimethoxysilane; r-glycidoxypropymethylidiethoxysilane; N-beta-(aminoethyl)-r-aminopropyl-trimethoxysilane; N-beta-(aminoethyl)-r-aminopropylmethyldimethoxysilane; 3-aminopropyl-triethoxysilane; N-phenyl-r-aminopropyl-trimethoxysilane; r-mercaptopropyltrimethoxysilane; r-chloropropyltrimethoxysilane; vinyltrichlorosilane; vinyltris (beta-methoxetkoxy) silane; vinyltrimethoxysilane; r-metacryloxypropyltrimethoxysilane; beta-(3,4 epoxycyclohexyl)-ethyltrimethoxysilane; r-glycidoxypropyltrimethoxysilane; r-glycidoxypropylmethylidiethoxysilane; N-beta-(aminoethyl-r-aminopropyltrimethoxysilane; N-beta-(aminoethyl)-r-aminopropylmethyldimethoxysilane; r-aminopropyltriethoxysilane; N-phenyl-r-aminopropyltrimethysilane; r-mercaptopropyltrimethoxysilane; r-chloropropylmethoxysilane; N [3-(trimethoxysilyl)propyl]-ethylenediamine; substituted silanes where one or more of the substitutions contains a different functional group; and combinations thereof. Generally, the silane coupling agent may be included in the liquid hardening agent component in an amount capable of sufficiently bonding the resin to the particulate. For example, the silane coupling agent may be included in the liquid hardening agent component in an amount in the range of from about 0.1% to about 95% by volume of the liquid hardening agent component. In other embodiments, the silane coupling agent may be included in the liquid hardening agent component in an amount in the range of from about 5% to about 50% by volume of the liquid hardening agent component.

A liquid carrier fluid may also be used in the liquid hardening agent component to, among other things, reduce the viscosity of the liquid hardening agent component for ease of handling, mixing and transferring. However, in some embodiments, it may be desirable, for environmental or safety reasons, not to use a liquid carrier fluid. Any suitable carrier fluid that is compatible with the liquid hardening agent component and achieves the desired viscosity effects may be suitable. Some suitable liquid carrier fluids are those having high flash points (e.g., above about 125° F.) because of, among other things, environmental and safety concerns. Such solvents may include, but are not limited to, polyethylene glycol, butyl lactate, butylglycidyl ether, dipropylene glycol methyl ether, dipropylene glycol dimethyl ether, dimethyl formamide, diethylene glycol methyl ether, ethylene glycol butyl ether, diethylene glycol butyl ether, propylene carbonate, D-Limonene, fatty acid methyl esters, and combinations thereof. In particular embodiments, selection of an appropriate liquid carrier fluid may be dependent on, inter alia, the other components of the resin composition.

Generally, the liquid hardening agent component may be included in the resin composition in an amount in the range of from about 1% to about 50% by volume of the resin composition. In particular embodiments, the liquid hardening agent component may be included in the resin composition in an amount in the range of from about 5% to about 25% by volume of the resin composition. In particular embodiments, the amount of liquid hardening agent composition may be selected to impart a desired elasticity or compressibility to a resulting seal. Generally, the lower the amount of hardening agent present in the resin composition, the greater the elasticity or compressibility of a resulting seal. With the benefit of this disclosure, it should be within the skill of one or ordinary skill in the art to select an appropriate amount of hardening agent to achieve a desired elasticity or compressibility for a particular application.

In some embodiments, the resin composition may further comprise CKD, which is a material generated in the manufacture of cement. CKD, as that term is used herein, refers to a partially calcined kiln feed which is removed from the gas stream and collected, for example, in a dust collector during the manufacture of cement. Usually, large quantities of CKD are collected in the production of cement that are commonly disposed of as waste. Disposal of the CKD as waste can add undesirable costs to the manufacture of the cement, as well as the environmental concerns associated with its disposal. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$. The term "CKD" is used herein to mean cement kiln dust made as described above and equivalent forms of cement kiln dust made in other ways.

The CKD may be used, among other things, as a non-hydrating filler material to lower the consumption of the more expensive components (e.g., hardenable resins, etc.) that are used in the resin composition. While the CKD is a cementitious component that sets and hardens in the presence of water, the CKD should be non-hydrated when mixed with the liquid hardenable resin component and optionally the liquid hardening agent component as the resin composition may be non-aqueous, for example. In this manner, the resin composition may be placed in position and allowed to harden with the CKD remaining non-hydrated. Because the CKD is present in the hardened composition, it is believed that the CKD may help counteract the potential formation of cracks in the hardened composition and/or micro-annulus that may form between the hardened composition and the casing or the wellbore wall. In general, the CKD is capable of setting and hardening when contacted by aqueous fluids to inhibit fluid flow through the crack and/or micro-annulus. Accordingly, the CKD may prevent and/or reduce the loss of zonal isolation in spite of the formation of cracks and/or micro-annulus, potentially resulting in an improved annular seal for embodiments of the resin composition.

Generally, the CKD may be included in the resin compositions in an amount in the range of from about 1% to about 60% by volume of the resin composition. In particular embodiments, the CKD may be included in the resin composition in an amount in the range of from about 20% to about 40% by volume of the resin composition. In specific embodiments, the CKD may be present in an amount ranging between any of and/or including any of about of about 1%, about 10%, about 20%, about 30%, about 40%, about 50%, or about 60% by volume of the resin composition. One of ordinary skill in the art, with the benefit of this disclosure, will recognize the appropriate amount of CKD to include for a chosen application.

While the preceding description describes CKD, the present disclosure is broad enough to encompass the use of other partially calcined kiln feeds. For example, embodiments of the resin composition may comprise lime kiln dust, which is a material that is generated during the manufacture of lime. The term "lime kiln dust" typically refers to a partially calcined kiln feed which can be removed from the gas stream and collected, for example, in a dust collector during the manufacture of lime. The chemical analysis of lime kiln dust from various lime manufactures varies depending on a number of factors, including the particular limestone or dolomitic limestone feed, the type of kiln, the mode of operation of the kiln, the efficiencies of the lime production operation, and the associated dust collection systems. Lime kiln dust generally may comprise varying amounts of free lime and free magnesium, lime stone, and/or dolomitic limestone and a variety of oxides, such as $SiO_2$, $Al_2O_3$, $Fe_2O_3$, CaO, MgO, $SO_3$, $Na_2O$, and $K_2O$, and other components, such as chlorides.

In some embodiments, the resin compositions may further comprise a weighting material. As used herein, the term "weighting material" refers to any particulate matter added to the resin composition to increase or lower density. Examples of weighting materials for lowering density include, but are not limited to, hollow microspheres. Examples of suitable hollow microspheres include, but are not limited to, hollow mineral glass spheres, such as "SPHERELITE®" available from Halliburton Energy Services of Duncan, Okla.; silica and alumina cenospheres, such as "CENOLITE™" available from Microspheres S.A. of South Africa; hollow glass microspheres, such as "SCOTCHLITE®" available from the 3M Company of St. Paul, Minn.; ceramic microspheres, such as "Z-LIGHT SPHERES™" available from the 3M Company of St. Paul, Minn.; polymeric microspheres, such as "EXPANCEL®" available from Akzo Nobel of The Netherlands; and plastic microspheres, such as "LUBRA-BEADS®" available from Halliburton Energy Services, Inc. of Duncan, Okla. Examples of suitable weighting materials for increasing density include, but are not limited to, silica, ilmenite, hematite, barite, Portland cement, manganese tetraoxide, and combinations thereof. Specific examples of weighting materials for increasing density include, but are not limited to, MICROSAND™, a crystalline silica weighting material, and a hematite weighting material, both available from Halliburton Energy Services, Inc. of Duncan, Okla.

The mean particulate sizes of the weighting material may generally range from about 2 nanometers to about 3000 microns in diameter; however, in certain circumstances, other mean particulate sizes may be desired and will be entirely suitable for use in the present methods. It should be understood that the term "particulate," as used in this disclosure, includes all known shapes of materials, including substantially spherical materials, fibrous materials, polygonal materials (such as cubic materials), and mixtures thereof. In particular embodiments, the particulate size of the weighting material may be selected to impart a desired viscosity to the resin composition. Moreover, in particular embodiments, weighting materials having different particulate sizes may be mixed to achieve a desired viscosity of the resin composition.

Generally, the weighting material may be included in the resin composition in an amount in the range of from about 1% to about 60% by volume of the resin composition. In particular embodiments, the weighting material may be included in the resin composition in an amount in the range of from about 20% to about 40% by volume of the resin composition.

In some embodiments, the resin composition may further comprise swellable particles. As used herein, the term "swellable particle" refers to any particle that swells upon contact with an aqueous fluid (e.g., water). Swellable particles suitable for use may generally swell by up to about 50% of their original size at the surface. Under downhole conditions, the amount of swelling may vary depending on the conditions presented. For example, in some embodiments, the amount of swelling may be at least 10% under downhole conditions. In particular embodiments, the amount of swelling may be up to about 50% under downhole conditions. However, as those of ordinary skill in the art, with the benefit of this disclosure will appreciate, the actual amount of swelling when the swellable particles are included in the resin composition may depend on the concentration of the swellable particles included in the composition, among other factors. For example, the swellable particles may be included in the resin composition, for example, to counteract the formation of cracks in a resultant wellbore seat and/or micro-annulus between the wellbore plug and the casing or the formation. In general, the swellable particles are capable of swelling when contacted by an aqueous fluid to inhibit fluid flow through the crack and/or micro-annulus. Accordingly, the swellable particles may prevent and/or reduce the loss of zonal isolation in spite of the formation of cracks and/or micro-annulus, potentially resulting in an improved annular seal for the resin composition.

Some specific examples of suitable swellable elastomers include, but are not limited to, natural rubber, acrylate butadiene rubber, polyacrylate rubber, isoprene rubber, choloroprene rubber, butyl rubber (IIR), brominated butyl rubber (BIIR), chlorinated butyl rubber (CIIR), chlorinated polyethylene (CM/CPE), neoprene rubber (CR), styrene butadiene copolymer rubber (SBR), sulphonated polyethylene (CSM), ethylene acrylate rubber (EAM/AEM), epichlorohydrin ethylene oxide copolymer (CO, ECO), ethylene-propylene rubber (EPM and EDPM), ethylene-propylene-diene terpolymer rubber (EPT), ethylene vinyl acetate copolymer, fluorosilicone rubbers (FVMQ), silicone rubbers (VMQ), poly 2,2,1-bicyclo heptene (polynorborneane), and alkylstyrene. One example of a suitable swellable elastomer comprises a block copolymer of a styrene butadiene rubber. Combinations of suitable swellable elastomers may also be used.

Some specific examples of suitable water-swellable polymers include, but are not limited, to starch-polyacrylate acid graft copolymer and salts thereof, polyethylene oxide polymer, carboxymethyl cellulose type polymers, polyacrylamide, poly(acrylic acid) and salts thereof, poly(acrylic acid-co-acrylamide) and salts thereof, graft-poly(ethylene oxide) of poly(acrylic acid) and salts thereof, poly(2-hydroxyethyl methacrylate), poly(2-hydroxypropyl methacrylate), and combinations thereof. Other water-swellable polymers that behave in a similar fashion with respect to aqueous fluids also may be suitable. In certain embodiments, the water-swellable polymers may be crosslinked and/or lightly crosslinked. Those of ordinary skill in the art, with the benefit of this disclosure, will be able to select an appropriate swellable elastomer and/or water-swellable polymer for use in particular embodiments of the resin composition used in accordance with the inventive methods based on a variety of factors, including the particular application in which the resin composition will be used and the desired swelling characteristics.

Generally, the swellable particles may be included in the resin composition in an amount sufficient to provide the desired mechanical properties. In some embodiments, the swellable particles may be present in the resin composition in an amount up to about 25% by weight of the hardenable resin. In some embodiments, the swellable particles may be present in the resin composition in the range of about 5% to about 25% by weight of the hardenable resin. In some embodiments, the swellable particles may be present in the resin composition in the range of about 15% to about 20% by weight of the hardenable resin.

In addition, the swellable particles that may be utilized may have a wide variety of shapes and sizes of individual particles. By way of example, the swellable particles may have a well-defined physical shape as well as an irregular geometry, including the physical shape of platelets, shavings, fibers, flakes, ribbons, rods, strips, spheroids, beads, pellets, tablets, or any other physical shape. In some embodiments, the swellable particles may have a mean particle size in the range of about 5 microns to about 1,500 microns, in some embodiments, the swellable particles may have a mean particle size in the range of about 20 microns to about 500 microns. However, particle sizes outside these defined ranges also may be suitable for particular applications.

Additional solid materials may also be included in the resin composition to enhance the strength, hardness, and/or toughness of the resulting seal. These solid materials may include both natural and man-made materials, and may have any shape, including, but not limited to, beaded, cubic, bar-shaped, cylindrical, or mixtures thereof, and may be in any form including, but not limited to flake or fiber form. Suitable materials may include, but are not limited to, cellulose fibers, carbon fibers, glass fibers, mineral fibers, plastic fibers (e.g., polypropylene and polyacrylic nitrite fibers), metallic fibers, metal shavings, Kevlar fibers, basalt fibers, wollastonite, micas (e.g., phlogopites and muscovites), and mixtures thereof. In some embodiments, nanoparticles and/or nanofibers may also be included in the resin composition, wherein the nanoparticles and/or nanofibers have at least one dimension less than 1 micron and, alternatively, less than about 100 nanometers.

Carbon fibers suitable for use in particular embodiments of the resin composition include high tensile modulus carbon fibers which have a high tensile strength. In some embodiments, the tensile modulus of the carbon fibers may exceed 180 GPa, and the tensile strength of the carbon fibers may exceed 3000 MPa. Generally, the fibers may have a mean length of about 1 mm or less. In some embodiments, the mean length of the carbon fibers is from about 50 to about 500 microns. In particular embodiment, the carbon fibers have a mean length in the range of from about 100 to about 200 microns. In particular embodiments, the carbon fibers may be milled carbon fibers. Suitable commercially available carbon fibers include, but are not limited to, "AGM-94" and "AGM-99" carbon fibers both available from Asbury Graphite Mills, Inc., of Asbury, N.J.

Metallic fibers suitable for use in particular embodiments of the resin composition may include non-amorphous (i.e., crystalline) metallic fibers. In particular embodiments, the non-amorphous metallic fibers may be obtained by cold drawing steel wires (i.e., steel wool). Suitable metallic fibers include, but are not limited to, steel fibers. Generally, the length and diameter of the metallic fibers may be adjusted such that the fibers are flexible and easily dispersible in the resin composition, and the resin composition is easily pumpable.

These additional solid materials may be present in the resin composition individually or in combination. Additionally, the solid materials may be present in the resin composition in a variety of lengths and/or aspect ratios. A person having ordinary skill in the art, with the benefit of this disclosure, will recognize the mixtures of type, length, and/or aspect ratio to use to achieve the desired properties of a resin composition for a particular application.

In particular embodiments, the hardenable resin, optional liquid hardening agent component, and CKD, as well as any of the additional optional additives (e.g., weighting material, swellable particles, additional solid materials) may be either batch-mixed or mixed on-the-fly. As used herein, the term "on-the-fly" means that a flowing stream is continuously introduced into another flowing stream so that the streams are combined and mixed while continuing to flow as a single stream as part of the on-going treatment. Such mixing may also be described as "real-time" mixing. On-the-fly mixing, as opposed to batch or partial batch mixing, may reduce waste and simplify subterranean treatments. This is due in part to the fact that, in particular embodiments, if the components are mixed and then circumstances dictate that the subterranean treatment be stopped or postponed, the mixed components may become unusable. By having the ability to rapidly shut down the mixing of streams on-the-fly in such embodiments, unnecessary waste may be avoided, resulting in, inter alia, increased efficiency and cost savings.

However, other embodiments of the resin composition may allow for batch mixing of the resin composition. In these embodiments, the resin composition may be sufficiently stable to allow the composition to be prepared in advance of its introduction into the wellbore without the composition becoming unusable if not promptly introduced into the wellbore.

An example of a suitable resin composition that can be used as the cement formulation of the settable cement composition and/or the resin formulation of the settable resin composition in accordance with the present methods is comprised of a hardenable epoxy resin and a hardening agent selected from the group consisting of amine based hardening agents and anhydride based hardening agents.

Another example of a suitable resin composition that can be used as the cement formulation of the settable cement composition and/or the resin formulation of the settable resin composition in accordance with the present methods is comprised of R1 (including 90% to 100% by weight diglycidyl ether bisphenol resin and 0% to 10% butyl glycidyl ether), 33.3% by weight R2 (cyclohexane methanol diglycidyl ether), based on the weight of R1, 38.7% by weight H1 (diethyl toluene diamine) (a hardener), based on the weight of R1, and 0% to 12% by weight A2 (2,4,6-tris(dimethylaminomethyl)phenol) (an accelerator), based on the weight of R1.

The Comingled Cement-Resin Composition

The comingled cement-resin composition that can be used as the cement formulation of the settable cement composition and/or the resin formulation of the settable resin composition in accordance with the present methods is a mixture of the conventional cement composition and the resin composition, as described above. The various optional components of the conventional cement composition and the resin composition, as described above, can also be included as deemed necessary or desired for the reasons stated above.

The ratio of the conventional cement composition to the resin composition in the comingled cement-resin composition can vary depending on the particular application. Factors such as the desired mechanical properties and placement time required. For example, the ratio of the conventional cement composition to the resin composition in the comingled cement-resin composition can range from 99:1 to 1:99. By way of further example, the ratio of the conventional cement composition to the resin composition in the comingled cement-resin composition can range from 95:5 to 50:50. By way of further example, the ratio of the conventional cement composition to the resin composition in the comingled cement-resin composition can range from 90:10 to 80:20. In many applications, the resin composition is present in the comingled cement-resin composition in an amount in the range of from about 5% to about 30% by volume based on the total volume of the comingled cement-resin composition.

An example of a suitable comingled cement-resin composition that can be used as the cement formulation of the settable cement composition and/or the resin formulation of the settable resin composition in accordance with the present methods is comprised of a hydraulic cement, an epoxy resin selected from the group of a condensation reaction product of epichlorohydrin and bisphenol A and an epoxidized bisphenol A novolac resin present in an amount in the range of from about 1% to about 50% by weight based on the weight of the hydraulic cement in the composition, a hardening agent for the epoxy resin selected from the group of aliphatic amines, aromatic amines and carboxylic acid anhydrides present in an amount in the range of from about 0.01% to about 15% by weight based on the weight of the hydraulic cement in the composition, and sufficient water to form a pumpable slurry.

Another example of a suitable comingled cement-resin composition that can be used as the cement formulation of the settable cement composition and/or the resin formulation of the settable resin composition in accordance with the present methods is comprised of a hydraulic cement, an epoxy resin selected from the group of a condensation reaction product of epichlorohydrin and bisphenol A and an epoxidized bisphenol A novolac resin present in an amount in the range of from about 1% to about 50% by weight based on the weight of hydraulic cement in the composition, a hardening agent for the epoxy resin selected from the group of aliphatic amines, aromatic amines and carboxylic acid anhydrides present in the composition in an amount in the range of from about 0.01% to about 15% by weight based on the weight of hydraulic cement in the composition, and a set retarding agent (for example, an alkali metal or alkaline earth metal lignosulfonate modified by reaction with formaldehyde and sodium bisulfite, present in an amount in the range of from about 0.1% to about 3% by weight based on the weight of hydraulic cement in the composition), amorphous silica powder present in an amount in the range of from about 10% to about 20% by weight based on the weight of hydraulic cement in the composition, a dispersing agent, for example, the condensation reaction product of formaldehyde, acetone and sodium bisulfite, present in an amount in the range of from about 0.05% to about 1% by weight based on the weight of hydraulic cement in the composition and sufficient water to form a pumpable slurry.

Yet another example of a suitable comingled cement-resin composition that can be used as the cement formulation of the settable cement composition and/or the resin formulation of the settable resin composition in accordance with the present methods is comprised of a hydraulic cement, an epoxy resin selected from the group of a condensation reaction product of epichlorohydrin and bisphenol A and an epoxidized bisphenol A novolac resin present in an amount in the range of from about 1% to about 50% by weight based on the weight of hydraulic cement in the composition, a hardening agent for said epoxy resin selected from the group of aliphatic amines, aromatic amines and carboxylic acid anhydrides present in an amount in the range of from about 1% to about 15% by weight based on the weight of hydraulic cement in the composition, water present in an amount of about 25% to about 35% by weight based on the weight of hydraulic cement in the composition, a gas present in an amount sufficient to form a foam having a density in the range of from about 12 to about 14 pounds per gallon, a foaming agent, for example, a sodium salt of alpha-olefinic sulfonic acid, present in an amount in the range of from about 3% to about 5% by weight based on the weight of water in the composition and a foam stabilizer, for example, cocoylamidopropylbetaine, present in an amount in the range of from about 1.5% to about 2.5% by weight based on the weight of water in the composition.

Still another example of a suitable comingled cement-resin composition that can be used as the cement formulation of the settable cement composition and/or the resin formulation of the settable resin composition in accordance with the present methods is comprised of a hydraulic cement, an epoxy resin selected from the group of a condensation reaction product of epichlorohydrin and bisphenol A and an epoxidized bisphenol A novolac resin present in an amount in the range of from about 1% to about 50% by weight based on the weight of hydraulic cement in the composition, a hardening agent for the epoxy resin selected from the group of aliphatic amines, aromatic amines and carboxylic acid anhydrides present in an amount in the range of from about 0.01% to about 15% by weight based on the weight of hydraulic cement in the composition, water present in an amount in the range of from about 25% to about 35% by weight based on the weight of hydraulic cement in the composition, a set retarding agent, for example, an alkali metal or alkaline earth metal lignosulfonate modified by reaction with formaldehyde and sodium bisulfite, present in an amount in the range of from about 0.1% to about 3% by weight based on the weight of hydraulic cement in the composition, amorphous silica powder present in an amount in the range of from about 10% to about 20% by weight based on the weight of hydraulic cement in the composition, a dispersing agent, e.g., the condensation reaction product of formaldehyde, acetone and sodium bisulfite, present in an amount in the range of from about 0.05% to about 1% by weight based on the weight of hydraulic cement in the composition, a gas selected from the group of air and nitrogen present in an amount sufficient to foam the cement composition, an effective amount of a foaming agent, for example, the sodium salt of an alpha-olefinic sulfonic acid, present in an amount in the range of from about 3% to about 5% by weight based on the weight of water in the composition and a foam stabilizer, e.g., cocoylamidopropylbetaine, present in an amount in the range of from about 1.5% to about 2.5% by weight based on the weight of water therein.

Referring now to the drawings and particularly to FIGS. 1-6, the present method is illustrated and described. Specifically, various techniques that can be used to form the cement sheath in the wellbore annulus and seal the interior of the casing in accordance with the present method are illustrated and described. As shown by each of FIGS. 1-6, a wellbore 12 is drilled through the surface 14 of the ground 16 into the ground. The wellbore 12 has a cylindrical cross section and includes a wellbore wall 20. A casing 30 is then lowered into the wellbore 12. The casing has an inside surface 32, an outside surface 34, an interior 36, a top end 38 and a bottom end 40. As shown, the wellbore 12 has a size such that a wellbore annulus 50 (a wellbore annulus) is formed between the outside surface 34 of the casing 30 and the wellbore wall 20 of the wellbore 12 when the casing is inserted into the wellbore. Once the casing 30 is lowered into the wellbore 12, fluid (for example, water) is circulated down the inside of the casing and up through the wellbore annulus.

Balanced Plug Method

As shown by FIG. 1, in this embodiment of the present method, an annular sheath of hardened substantially impermeable material is first formed in the wellbore annulus 50. The annular sheath physically supports and positions the casing 30 in the wellbore and bonds the outside surface 34 of the casing to the wellbore wall 20 whereby the undesirable migration of fluids between zones or formations penetrated by the wellbore 12 is prevented.

The annular cement sheath can be formed by any known primary cementing method for cementing the casing in place in an oil and gas well that penetrates a subterranean formation. For example, the desired volume of a settable cement composition 60 (for example, a cement composition) can be pumped and circulated down the inside of the casing 30 through the bottom end 40 of the casing and up into the wellbore annulus 50. Water or some other fluid 62 (for example, drilling mud, a saltwater brine or a conventional spacer fluid) can be used to displace the settable cement composition 60 out of the casing 30 into the wellbore annulus 50. Once it is in place as desired, the settable cement composition 60 can then be allowed to set in the wellbore annulus 50 to form the cement sheath. For example, the settable cement composition 60 and resulting cement sheath can fill the wellbore annulus 50 thereby covering the entire outside surface of the casing 30 from the bottom of the wellbore 12 and the bottom end 40 of the casing to the surface 14.

Next, the balanced plug method is used to seal the portion 64 of the interior 36 of the casing 30 adjacent to the bottom end 40 of the casing. A balanced plug is placed in the casing 30 itself, not the wellbore annulus 50. A tubular workstring 70 is lowered from the surface 14 into the casing 30 such that the end 72 of the tubular workstring is placed at the desired distance within the casing from the bottom end 40 of the casing. A settable resin composition 76 (a resin composition or a comingled cement-resin composition) is then pumped down the inside of the tubular workstring 70 until the resin composition is of equal height inside the tubular workstring and inside the portion 78 of the casing 30 outside of the tubular workstring. The settable resin composition will fill the interior 36 of the casing 30 adjacent to the bottom end 40 of the casing to a desired height within the casing. The height of the settable resin composition 76 within the casing 30 will vary depending, for example, on the diameter of the casing.

Once the settable resin composition 76 is in place as desired, pumping is stopped, and the tubular workstring 70 is pulled out of the settable resin composition. The settable resin composition is then allowed to set and form a consistent fluid plug or seal 80. The seal 80 seals the interior 36 of the casing 30 to help prevent gas that is stored in the casing from inadvertently escaping from the casing. For example, the seal 80 is a gas tight seal in the casing 30. In this method, it is important for the resin composition to be of approximately equal height inside the tubular workstring and inside the portion 78 of the casing 30 outside of the tubular workstring. If not, an unbalanced condition can occur which can cause water from the tubular workstring to form what is called a "wet stand" and compromise the seal.

Dump Bail Method

Figure 2:
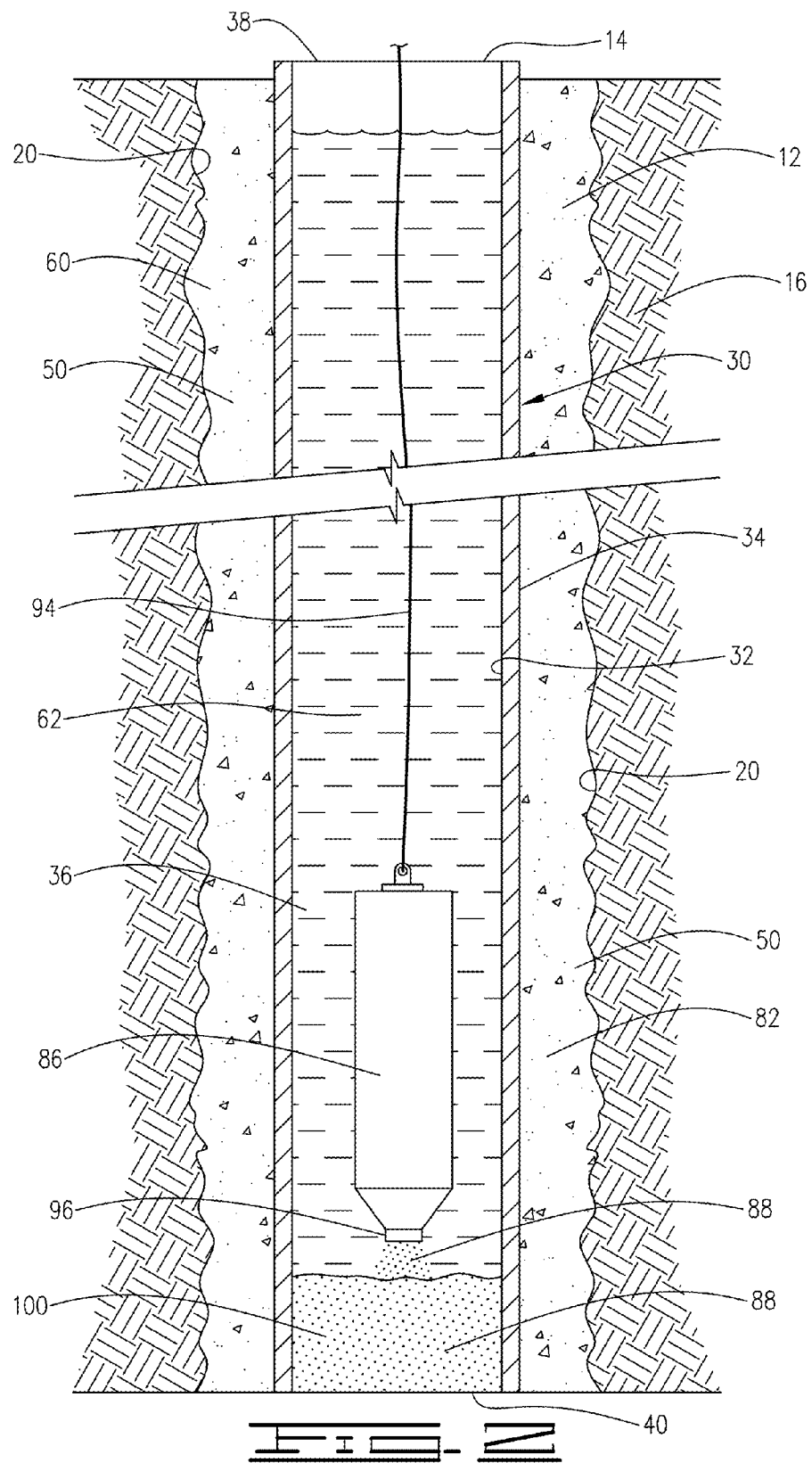

As shown by FIG. 2, in this embodiment of the present method, a cement sheath formed in the wellbore annulus 50. As with the balanced plug method, the cement sheath can be formed by any method known for cementing the casing in place in an oil and gas well that penetrates a subterranean formation. For example, the desired volume of a settable cement composition 82 (for example, a conventional cement composition) can be pumped through the bottom end 40 of the casing 30 into the wellbore annulus 50. Water or some other fluid 84 (for example, drilling mud) can be used to displace the settable cement composition 82 out of the casing 30 into the wellbore annulus 50. Once it is in place as desired, the settable cement composition 82 can then be allowed to set in the wellbore annulus 50 to form the cement sheath. For example, the settable cement composition 82 and resulting cement sheath can fill the wellbore annulus 50 thereby covering the entire outside surface of the casing 30 from the bottom of the wellbore 12 and the bottom end 40 of the casing to the surface 14.

Next, a dump bail container 86 is used to seal the portion 64 of the interior 36 of the casing 30 adjacent to the bottom end 40 of the casing. The desired amount of a settable resin composition 88 (for example, a resin composition or a comingled cement-resin composition) is placed into a dump bail container 86 at the surface 14. The dump bail container 86 is then lowered from the surface 14 into the casing 30 by a wireline 94 to a depth such that the end 96 of the dump bail container is placed at the desired distance within the casing from the bottom end 40 of the casing. The settable resin composition 88 is then released by the dump bail container 86 by actuating an opening mechanism 98 located in the end 96 of the dump bail container such that the settable resin composition fills the interior 36 of the casing 30 adjacent to the bottom end 40 of the casing to a desired height within the casing. The height of the settable resin composition 76 within the casing 30 will vary depending, for example, on the diameter of the casing. If necessary, one or more additional trips using the dump bail container 86 can be made until the desired volume of the settable resin composition 88 is placed in the casing 30.

Once the settable resin composition 88 is in place as desired, it is then allowed to set and form a consistent fluid plug or seal 100. The seal 100 seals the interior 36 of the casing 30 to help prevent gas that is stored in the casing from inadvertently escaping from the casing. For example, the seal 100 is a gas tight seal in the casing 30.

Independent Settable Composition Pumping

Figure 3:
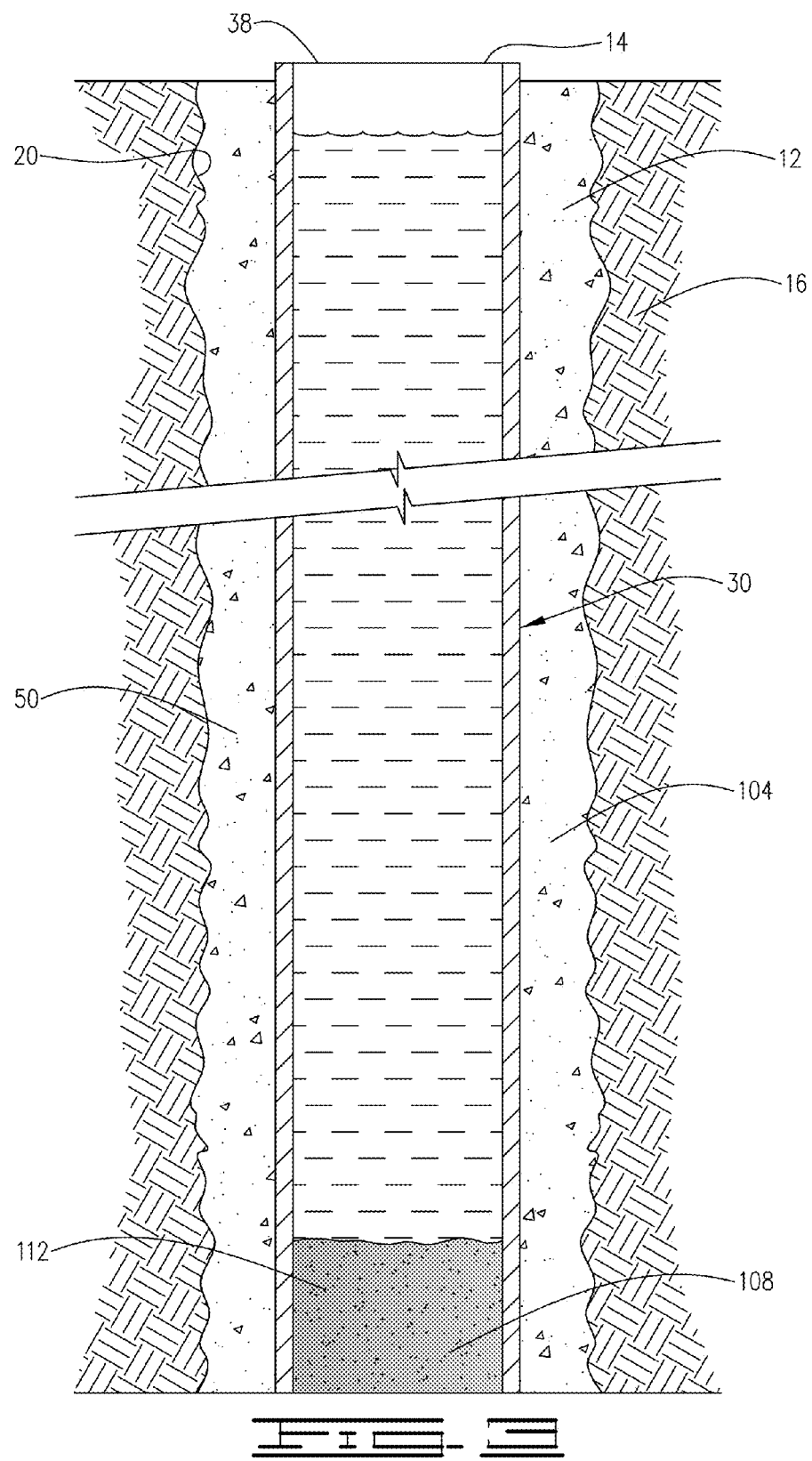

As shown by FIG. 3, in this embodiment of the present method, the volume of a settable cement composition 104 (for example, a conventional cement composition) desired to form a cement sheath in the wellbore annulus 50 is pumped into the casing 30. Depending on the volume of the settable cement composition 104 that is desired and pumped, part of the settable cement composition may flow through the bottom end 40 of the casing 30 and up into the wellbore annulus 50. Next, before the settable cement composition sets, the volume of a settable resin composition 108 (a resin composition or comingled cement-resin composition) desired to displace the settable cement composition 104 out of the bottom end 40 of the casing 30 and up into the wellbore annulus 50, and fill the interior 36 of the casing 30 adjacent to the bottom end 40 of the casing to a desired height within the casing, is pumped into the casing 30. Pumping of the settable resin composition 108 is stopped once the desired height of the settable resin composition within the casing is reached. The height of the settable resin composition 108 within the casing 30 will vary depending, for example, on the diameter of the casing. The settable cement composition 104 and settable resin composition 108 can be pumped into the casing 30, and the settable cement composition can be displaced into the wellbore annulus 50 and allowed to form a cement sheath, by any method known for cementing the casing in place in an oil and gas well that penetrates a subterranean formation.

Once the settable cement composition 104 is in place in the wellbore annulus 50 as desired, and once the settable resin composition 108 is in place in the casing 30 as desired, the settable cement composition and settable resin composition are allowed to set. The settable cement composition 104 forms a cement sheath in the wellbore annulus 50. For example, the settable cement composition 82 and resulting cement sheath can fill the wellbore annulus 50 thereby covering the entire outside surface of the casing 30 from the bottom of the wellbore 12 and the bottom end 40 of the casing to the surface 14. The settable resin composition forms a consistent fluid plug or seal 112. The seal 112 seals the interior 36 of the casing 30 to help prevent gas that is stored in the casing from inadvertently escaping from the casing. For example, the seal 112 is a gas tight seal in the casing 30.

Single Settable Composition

Figure 4:
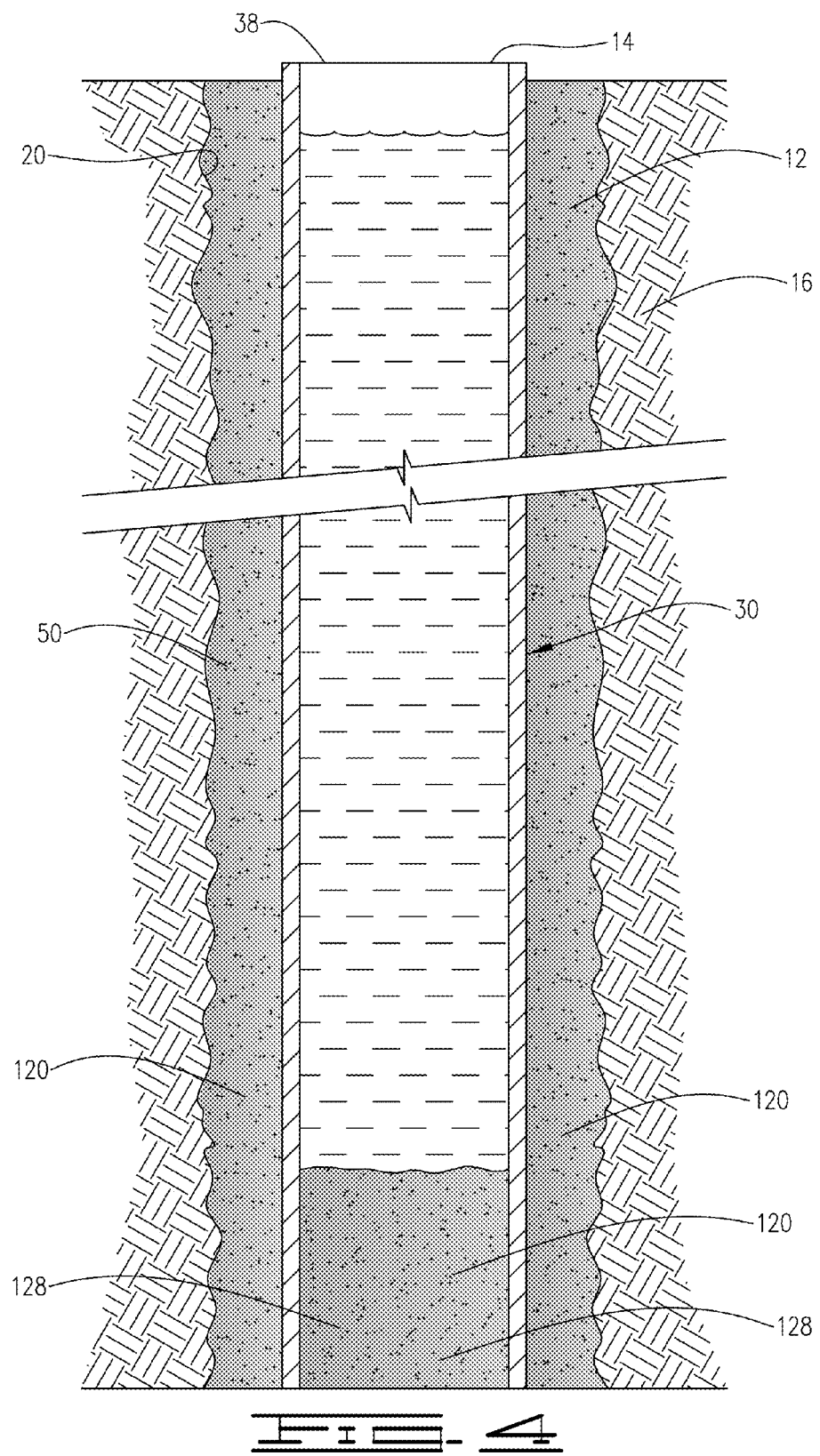

As shown by FIG. 4, in this embodiment of the present method, a cement sheath is formed in the wellbore annulus 50, and the interior of the casing is sealed, using a single settable composition 120. The single settable composition 120 can be either a resin composition or a comingled cement-resin composite.

The desired volume of the single settable composition 120 is pumped and circulated down the inside of the casing 30 through the bottom end 40 of the casing and up into the wellbore annulus 50. Pumping is stopped once the single settable composition 120 fills the wellbore annulus as desired and fills the interior 36 of the casing 30 adjacent to the bottom end 40 of the casing to a desired height within the casing. The height of the settable resin composition 120 within the casing 30 will vary depending, for example, on the diameter of the casing. The single settable composition 120 can be pumped into the casing 30 and into the wellbore annulus 50 and allowed to set by any method known for cementing the casing in place in an oil and gas well that penetrates a subterranean formation.

Once in place as desired, the single settable composition 120 is allowed to set. Specifically, the single settable composition 120 is allowed to set in the wellbore annulus 50 to form the cement sheath therein. For example, the settable cement composition 120 and resulting cement sheath can fill the wellbore annulus 50 thereby covering the entire outside surface of the casing 30 from the bottom of the wellbore 12 and the bottom end 40 of the casing to the surface 14. The single settable composition 120 is also allowed to set in the casing 30 and form a consistent fluid plug or seal 128. The seal 128 seals the interior 36 of the casing 30 to help prevent gas that is stored in the casing from inadvertently escaping from the casing. For example, the seal 128 is a gas tight seal in the casing 30.

CNG can be stored in the subterranean gas storage vessel formed in accordance with the present methods by injecting natural gas into the casing at a sufficient pressure to cause the natural gas to compress. For example, the natural gas can be injected into the casing in a manner such that the natural gas in pressurized in the casing to a pressure of at least 1000 psi. For example, the natural gas can be compressed to less than one percent of the volume it would otherwise occupy in the storage vessel at standard atmospheric pressure. For example, the CNG can be stored in the storage vessel at a storage pressure of 100 psi to 10,000 psi. For example, the CNG can be stored in the storage vessel at a storage pressure of 500 psi to 5,000 psi. For example, in some applications, the CNG might be stored in the storage vessel at a storage pressure of 2,900 to 3,600 psi.

Natural gas can be withdrawn from the subterranean gas storage vessel formed in accordance with the present method and dispensed thereby as needed. In order to maintain the desired storage pressure, for example, after natural gas is withdrawn from the storage vessel, the storage vessel is periodically re-pressurized to the desired storage pressure by injecting natural gas under pressure therein.

For example, the subterranean gas storage vessel formed in accordance the present method can be used in connection with an automotive or other vehicle CNG filling station. Conventional equipment as known to those in the art can be used to withdraw the CNG from the storage vessel and dispense it in such a manner that it can be transferred to the automobile or other vehicle.

Various additional modifications can be made to the inventive methods. For example, the cement sheath may be partially formed and the interior of the casing and may be sealed in accordance with the inventive methods in stages. For example, a settable cement composition can be pumped into a first section of wellbore annulus and allowed to set, and then pumped into a second section of the wellbore annulus and allowed to set, etc. For example, the present methods may be carried out multiple times to install casing strings in pieces with intermediate drilling operations being performed between introduction of a new section of casing.

For example, in one embodiment, a method of forming a subterranean gas storage vessel is provided. In this embodiment, the method comprises the following steps:

(a) drilling a wellbore through the surface of the ground into the ground, the wellbore having a wellbore wall;

(b) inserting a casing into the wellbore, the casing having an interior, an outside surface, a top and a bottom end, the casing further having a size such that a wellbore annulus is formed between the casing and the wellbore wall when the casing is inserted into the wellbore;

(c) forming a cement sheath in the wellbore annulus by placing a settable cement composition in the wellbore annulus and allowing the settable cement composition to set, the settable cement composition being selected from the group consisting of a cement composition, a resin composition and a comingled cement-resin composition; and (d) sealing at least a portion of the interior of the casing adjacent to the bottom end of the casing to help prevent gas that is stored in the casing from inadvertently escaping from the casing, the interior of the casing being sealed by placing a settable resin composition in the interior of the casing and allowing the settable resin composition to set, the settable resin composition being selected from the group consisting of a resin composition and a comingled cement-resin composition.

For example, in another embodiment, a method of forming a subterranean gas storage vessel and using the subterranean gas storage vessel to store compressed natural gas is provided. In this embodiment, the method comprises the following steps:

(a) drilling a wellbore through the surface of the ground into the ground, the wellbore having a wellbore wall;

(b) inserting a casing into the wellbore, the casing having an interior, an outside surface, a top and a bottom end, the casing further having a size such that a wellbore annulus is formed between the casing and the wellbore wall when the casing is inserted into the wellbore;

(c) forming a cement sheath in the wellbore annulus by placing a settable cement composition in the wellbore annulus and allowing the settable cement composition to set, the settable cement composition being selected from the group consisting of a cement composition, a resin composition and a comingled cement-resin composition;

(d) sealing at least a portion of the interior of the casing adjacent to the bottom end of the casing to help prevent gas that is stored in the casing from inadvertently escaping from the casing, the interior of the casing being sealed by placing a settable resin composition in the interior of the casing and allowing the settable resin composition to set, the settable resin composition being selected from the group consisting of a resin composition and a comingled cement-resin composition;

(e) injecting natural gas into the casing in a manner such that the natural gas in pressurized in the casing to a pressure of at least 100 psi; and (f) storing compressed natural gas in the casing.

For example, in yet another embodiment, a method of forming a subterranean gas storage vessel and using the subterranean gas storage vessel to store compressed natural gas and dispense natural gas is provided. In this embodiment, the method comprises the following steps:

(a) drilling a wellbore through the surface of the ground into the ground, the wellbore having a wellbore wall;

(b) inserting a casing into the wellbore, the casing having an interior, an outside surface, a top and a bottom end, the casing further having a size such that a wellbore annulus is formed between the casing and the wellbore wall when the casing is inserted into the wellbore;

(c) forming a cement sheath in the wellbore annulus by placing a settable cement composition in the wellbore annulus and allowing the settable cement composition to set, the settable cement composition being selected from the group consisting of a cement composition, a resin composition and a comingled cement-resin composition;

(d) sealing at least a portion of the interior of the casing adjacent to the bottom end of the casing to help prevent gas that is stored in the casing from inadvertently escaping from the casing, the interior of the casing being sealed by placing a settable resin composition in the interior of the casing and allowing the settable resin composition to set, the settable resin composition being selected from the group consisting of a resin composition and a comingled cement-resin composition;

(e) injecting natural gas into the casing in a manner such that the natural gas in pressurized in the casing to a pressure of at least 100 psi;

(f) storing compressed natural gas in the casing; and (g) withdrawing natural gas from the casing as needed.

The exemplary compositions disclosed herein may directly or indirectly affect one or more components or pieces of equipment associated with the preparation, delivery, recapture, recycling, reuse, and/or disposal of the disclosed compositions. For example, the disclosed compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary compositions. The disclosed compositions may also directly or indirectly affect any transport or delivery equipment used to convey the compositions to a well site or downhole such as, for example, any transport vessels, conduits, pipelines, trucks, tubulars, and/or pipes used to compositionally move the exemplary compositions from one location to another, any pumps, compressors, or motors (e.g., topside or downhole) used to drive the exemplary compositions into motion, any valves or related joints used to regulate the pressure or flow rate of the exemplary compositions, and any sensors (i.e., pressure and temperature), gauges, and/or combinations thereof, and the like. The disclosed compositions may also directly or indirectly affect the various downhole equipment and tools that may come into contact with the cement compositions/additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Referring now to FIG. 5, a system that may be used in the preparation of a cement composition in accordance with example embodiments will now be described. FIG. 5 illustrates a system 200 for preparation of a settable cement composition and/or settable resin composition (hereafter collectively the "cement composition") and delivery to a wellbore in accordance with certain embodiments. As shown, the cement composition may be mixed in mixing equipment 204, such as a jet mixer, re-circulating mixer, or a batch mixer, for example, and then pumped via pumping equipment 206 to the wellbore. In some embodiments, the mixing equipment 204 and the pumping equipment 206 may be disposed on one or more cement trucks as will be apparent to those of ordinary skill in the art. In some embodiments, a jet mixer may be used, for example, to continuously mix the composition, including water, as it is being pumped to the wellbore.

Figure 6B:
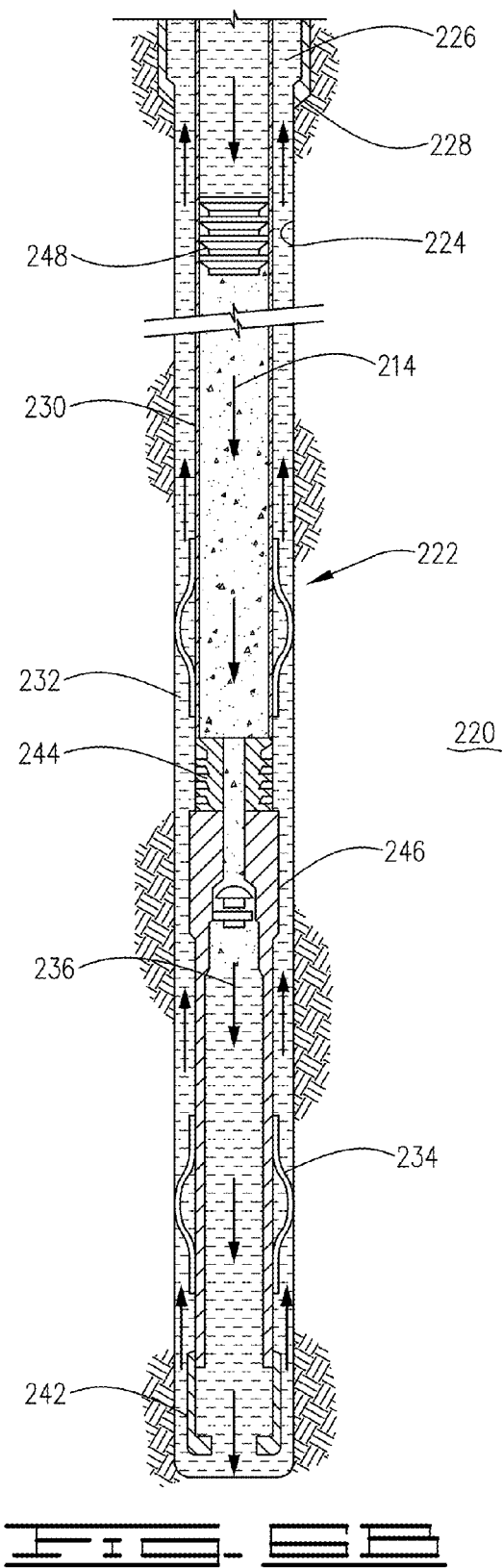
FIG. 6B illustrates placement of a settable cement composition and/or a settable resin composition into a casing and/or wellbore annulus in accordance with aspects of the present disclosure.

An example technique and system for placing a cement composition into a subterranean formation will now be described with reference to FIGS. 6A and 6B. FIG. 6A illustrates surface equipment 210 that may be used in placement of a cement composition in accordance with certain embodiments. It should be noted that while FIG. 6A generally depicts a land-based operation, those skilled in the art will readily recognize that the principles described herein are equally applicable to subsea operations that employ floating or sea-based platforms and rigs, without departing from the scope of the disclosure. As illustrated by FIG. 6A, the surface equipment 210 may include a cementing unit 212, which may include one or more cement trucks. The cementing unit 212 may include mixing equipment 204 and pumping equipment 206 (e.g., FIG. 1) as will be apparent to those of ordinary skill in the art. The cementing unit 212 may pump a cement composition 214 through a feed pipe 216 and to a cementing head 218 which conveys the cement composition 214 downhole.

Turning now to FIG. 6B, the cement composition 214 may be placed into a subterranean formation 220 in accordance with example embodiments. As illustrated, a wellbore 222 may be drilled into the subterranean formation 220. While wellbore 222 is shown extending generally vertically into the subterranean formation 220, the principles described herein are also applicable to wellbores that extend at an angle through the subterranean formation 220, such as horizontal and slanted wellbores. As illustrated, the wellbore 222 comprises walls 224. In the illustrated embodiments, a surface casing 226 has been inserted into the wellbore 222. The surface casing 226 may be cemented to the walls 224 of the wellbore 222 by cement sheath 228. In the illustrated embodiment, one or more additional conduits (e.g., intermediate casing, production casing, liners, etc.) shown here as casing 230 may also be disposed in the wellbore 222. As illustrated, there is a wellbore annulus 232 formed between the casing 230 and the walls 224 of the wellbore 222 and/or the surface casing 226. One or more centralizers 234 may be attached to the casing 230, for example, to centralize the casing 230 in the wellbore 222 prior to and during the cementing operation.

With continued reference to FIG. 6B, the cement composition 214 may be pumped down the interior of the casing 230. The cement composition 214 may be allowed to flow down the interior of the casing 230 through the casing shoe 242 at the bottom end of the casing 230 and up around the casing 230 into the wellbore annulus 232. The cement composition 214 may be allowed to set in the wellbore annulus 232, for example, to form a cement sheath that supports and positions the casing 230 in the wellbore 222. While not illustrated, other techniques may also be utilized for introduction of the cement composition 214. By way of example, reverse circulation techniques may be used that include introducing the cement composition 214 into the subterranean formation 220 by way of the wellbore annulus 232 instead of through the casing 230.

As it is introduced, the cement composition 214 may displace other fluids 236, such as drilling fluids and/or spacer fluids that may be present in the interior of the casing 230 and/or the wellbore annulus 232. At least a portion of the displaced fluids 236 may exit the wellbore annulus 232 via a flow line 238 and be deposited, for example, in one or more retention pits 240 (e.g., a mud pit), as shown on FIG. 6A. Referring again to FIG. 6B, a bottom plug 244 may be introduced into the wellbore 222 ahead of the cement composition 214, for example, to separate the cement composition 214 from the fluids 236 that may be inside the casing 230 prior to cementing. After the bottom plug 244 reaches the landing collar 246, a diaphragm or other suitable device ruptures to allow the cement composition 214 through the bottom plug 244. In FIG. 6B, the bottom plug 244 is shown on the landing collar 246. In the illustrated embodiment, a top plug 248 may be introduced into the wellbore 222 behind the cement composition 214. The top plug 248 may separate the cement composition 214 from a displacement fluid 250 and also push the cement composition 214 through the bottom plug 244.

For the sake of brevity, only certain ranges are explicitly disclosed herein. However, ranges from any lower limit may be combined with any upper limit to recite a range not explicitly recited and ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present methods are well adapted to attain the ends and advantages mentioned, as well as those that are inherent therein. The particular embodiments disclosed above are illustrative only, as the present methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified, and all such variations are considered within the scope and spirit of the present methods. While compositions and methods are described in terms of "comprising," "containing," "having," or "including" various components or steps, the compositions and methods can also "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of forming a subterranean gas storage vessel, comprising:
   drilling a wellbore through the surface of the ground into the ground, said wellbore having a wellbore wall;
   inserting a casing into the wellbore, said casing having an interior, an outside surface, a top and a bottom end, said casing further having a size such that a wellbore annulus is formed between said outside surface of the casing and said wellbore wall when said casing is inserted into said wellbore;
   pumping a settable cement composition into said interior of said casing;
   pumping a settable resin composition into said interior of said casing before said settable cement composition has set, wherein said settable resin composition is pumped so as to displace said settable cement composition from said interior of said casing and into said wellbore annulus and wherein said pumping of said settable resin composition is stopped once said settable resin composition reaches a predetermined height within said casing;
   allowing said settable cement composition to set so as to form a cement sheath in said wellbore annulus; and
   allowing said settable resin composition to set so as to seal at least a portion of the interior of said casing to help prevent gas that is stored in said casing from inadvertently escaping from said casing.

2. The method of claim 1, wherein said step of sealing at least a portion of the interior of said casing includes sealing said interior of said casing adjacent to said bottom end of said casing.

3. The method of claim 1, wherein said settable cement composition includes a cement formulation and enough water to form a pumpable slurry, and said settable resin composition includes a resin formulation and enough water to form a pumpable slurry.

4. The method of claim 3, wherein said cement formulation is selected from the group consisting of a conventional cement composition, a resin composition and a comingled cement-resin composition, and said resin formulation is selected from the group consisting of a resin composition and a comingled cement-resin composition.

5. The method of claim 4, wherein said cement formulation is a conventional cement composition, and said resin formulation is a resin composition.

6. The method of claim 4, wherein said cement formulation is a conventional cement composition, and said resin formulation is a comingled cement-resin composition.

7. The method of claim 4, wherein both said cement formulation and said resin formulation are a resin composition.

8. The method of claim 4, wherein both said cement formulation and said resin formulation are a comingled cement-resin composition.

9. The method of claim 4, wherein said cement formulation includes a hydraulic cement.

10. The method of claim 4, wherein said resin composition includes a hardenable epoxy resin and a hardening agent selected from the group consisting of amine based hardening agents and anhydride based hardening agents.

11. The method of claim 4, wherein said comingled cement-resin composition includes a hydraulic cement, a hardenable epoxy resin and a hardening agent selected from the group consisting of amine based hardening agents and anhydride based hardening agents.

12. The method of claim 1, wherein said casing has a diameter in the range of from 4.5 inches to 24.5 inches, and a wall thickness in the range of from 0.1 inches to 2 inches.

13. A method of forming a subterranean gas storage vessel and using the subterranean gas storage vessel to store compressed natural gas, comprising:
   drilling a wellbore through the surface of the ground into the ground, said wellbore having a wellbore wall;
   inserting a casing into the wellbore, said casing having an interior, an outside surface, a top and a bottom end, said casing further having a size such that a wellbore annulus is formed between said casing and said wellbore wall when said casing is inserted into said wellbore;
   pumping a settable cement composition into said interior of said casing, forming a said settable cement composition including a cement formulation and enough water to form a pumpable slurry, said cement formulation being selected from the group consisting of a conventional cement composition, a resin composition and a comingled cement-resin composition;
   pumping a settable resin composition into said interior of said casing before said settable cement composition has set, wherein said settable resin composition is pumped so as to displace said settable cement composition from said interior of said casing and into said wellbore annulus and wherein said pumping of said settable resin composition is stopped once said settable resin composition reaches a predetermined height within said casing;
   allowing said settable cement composition to set so as to form a cement sheath in said wellbore annulus;
   allowing said settable resin composition to set so as to seal at least a portion of the interior of said casing adjacent to said bottom end of said casing to help prevent gas that is stored in said casing from inadvertently escaping from said casing, said settable resin composition including a resin formulation and enough water to form a pumpable slurry, said resin formulation being selected from the group consisting of a resin composition and a comingled cement-resin composition;

injecting natural gas into said casing in a manner such that said natural gas is pressurized in said casing to a pressure of at least 100 psi; and storing compressed natural gas in said casing.

14. The method of claim 13, wherein said settable cement composition is a cement composition, and said settable resin composition is selected from the group consisting of a resin composition and a comingled cement-resin composition.

15. The method of claim 13, wherein said settable cement composition is a cement composition, and said settable resin composition is a resin composition.

16. A method of forming a subterranean gas storage vessel and using the subterranean gas storage vessel to store compressed natural gas and dispense natural gas, comprising:

drilling a wellbore through the surface of the ground into the ground, said wellbore having a wellbore wall;

inserting a casing into the wellbore, said casing having an interior, an outside surface, a top and a bottom end, said casing further having a size such that a wellbore annulus is formed between said casing and said wellbore wall when said casing is inserted into said wellbore;

pumping a settable cement composition into said interior of said casing, said settable cement composition including a cement formulation and enough water to form a pumpable slurry, said cement formulation being selected from the group consisting of a conventional cement composition, a resin composition and a comingled cement-resin composition;

pumping a settable resin composition into said interior of said casing before said settable cement composition has set, wherein said settable resin composition is pumped so as to displace said settable cement composition from said interior of said casing and into said wellbore annulus and wherein said pumping of said settable resin composition is stopped once said settable resin composition reaches a predetermined height within said casing;

allowing said settable cement composition to set so as to form a cement sheath in said wellbore annulus;

allowing said settable resin composition to set so as to seal at least a portion of the interior of said casing adjacent to said bottom end of said casing to help prevent gas that is stored in said casing from inadvertently escaping from said casing, said settable resin composition including a resin formulation and enough water to form a pumpable slurry, said resin formulation being selected from the group consisting of a resin composition and a comingled cement-resin composition;

injecting natural gas into said casing in a manner such that said natural gas is pressurized in said casing to a pressure of at least 100 psi;

storing compressed natural gas in said casing; and withdrawing natural gas from said casing as needed.

17. The method of claim 16, wherein said settable cement composition is a cement composition, and said settable resin composition is selected from the group consisting of a resin composition and a comingled cement-resin composition.

18. The method of claim 16 wherein said settable cement composition comprises components and further comprising mixing the components of said settable cement composition and said settable resin composition using mixing equipment.

19. The method of claim 16 wherein said settable cement composition is placed in said wellbore annulus using one or more pumps.

* * * * *

UNITED STATES PATENT AND TRADEMARK OFFICE
CERTIFICATE OF CORRECTION

| | | |
|---|---|---|
| PATENT NO. | : 9,896,269 B2 | |
| APPLICATION NO. | : 14/702518 | |
| DATED | : February 20, 2018 | |
| INVENTOR(S) | : Brett Wade Williams et al. | |

It is certified that error appears in the above-identified patent and that said Letters Patent is hereby corrected as shown below:

In the Claims

In Claim 13, Line 13, delete "forming a."

Signed and Sealed this
First Day of May, 2018

Andrei Iancu
*Director of the United States Patent and Trademark Office*